US009418541B2

(12) United States Patent
Huang et al.

(10) Patent No.: US 9,418,541 B2
(45) Date of Patent: Aug. 16, 2016

(54) METHOD OF REMOTELY CONTROLLING ELECTRICAL APPLIANCES

(71) Applicant: GRAND MATE CO., LTD., Taichung (TW)

(72) Inventors: Chung-Chin Huang, Taichung (TW); Chin-Ying Huang, Taichung (TW); Hsin-Ming Huang, Taichung (TW); Hsing-Hsiung Huang, Taichung (TW); Yen-Jen Yeh, Yunlin (TW)

(73) Assignee: GRAND MATE CO., LTD., Taichung (TW)

( * ) Notice: Subject to any disclaimer, the term of this patent is extended or adjusted under 35 U.S.C. 154(b) by 110 days.

(21) Appl. No.: 14/341,408

(22) Filed: Jul. 25, 2014

(65) Prior Publication Data

US 2015/0294558 A1 Oct. 15, 2015

(30) Foreign Application Priority Data

Apr. 9, 2014 (TW) ............................. 103113087 A

(51) Int. Cl.

| | |
|---|---|
| ***H04M 3/00*** | (2006.01) |
| ***G08C 17/02*** | (2006.01) |
| ***G08C 23/04*** | (2006.01) |
| ***H04L 12/12*** | (2006.01) |
| ***H04L 12/40*** | (2006.01) |

(52) U.S. Cl.

CPC ............ *G08C 17/02* (2013.01); *G08C 2201/40* (2013.01); *G08C 2201/42* (2013.01); *G08C 2201/93* (2013.01)

(58) Field of Classification Search

CPC ......... H04M 3/00; G08C 17/02; G08C 23/04; H04L 12/12; H04L 12/40; H04L 9/14; G05B 19/00; G06F 7/00; H04B 1/00

USPC ........ 340/12.22, 12.23, 825.22, 825.25, 5.25, 340/5.64, 5.72; 710/5, 15, 72; 348/734; 307/11, 38, 40

See application file for complete search history.

(56) References Cited

U.S. PATENT DOCUMENTS 6,020,881 A * 2/2000 Naughton ............... H04L 29/06 348/E5.102
7,027,881 B2 * 4/2006 Yumoto ................. G08C 17/02 700/168
7,155,213 B1 * 12/2006 Almeda ................. G08C 23/04 340/12.53

(Continued)

*Primary Examiner* — Nam V Nguyen
(74) *Attorney, Agent, or Firm* — Ming Chow; Sinorica, LLC

(57) ABSTRACT

A method of remotely controlling electrical appliances includes the steps of: inputting ID codes of a plurality of electrical appliances into a remote control device; selecting one of the electrical appliances and a corresponding operating command on the remote control device; generating a Wi-Fi signal to carry the first packet; transmitting the Wi-Fi signal to a repeater; converting the first packet carried thereby into a second packet; generating a RF signal to carry the second packet; transmitting the RF signal to the electrical appliances; comparing a ID code kept in a second ID code field of the second packet to the ID codes of the electrical appliances. Finally, the electrical appliance which has the matched ID code performs an operation according to an operating command in a second data field of the second packet.

9 Claims, 3 Drawing Sheets

(56) References Cited

U.S. PATENT DOCUMENTS

| | | | | |
|---|---|---|---|---|
| 8,232,861 | B2 * | 7/2012 | Tsou | G08C 17/02 340/5.21 |
| 8,509,400 | B2 * | 8/2013 | Liu | G08C 17/02 340/539.1 |
| 8,638,198 | B2 * | 1/2014 | Vanderhoff | H04N 21/42226 340/12.15 |
| 8,942,694 | B2 * | 1/2015 | Woo | G08C 17/02 455/41.1 |
| 9,024,732 | B2 * | 5/2015 | Huang | F24C 3/00 340/10.5 |
| 2007/0050054 | A1 * | 3/2007 | Sambandam Guruparan | G08C 19/28 700/65 |
| 2008/0055108 | A1 * | 3/2008 | Han | G08C 17/02 340/4.32 |
| 2013/0300564 | A1 * | 11/2013 | Lamb | G08B 25/008 340/573.4 |
| 2014/0064735 | A1 * | 3/2014 | Thompson | H04B 10/1149 398/106 |

* cited by examiner

METHOD OF REMOTELY CONTROLLING ELECTRICAL APPLIANCES

The current application claims a foreign priority to the patent application of Taiwan No. 103113087 filed on Apr. 9, 2014.

BACKGROUND OF THE INVENTION

1. Technical Field

The present invention relates generally to controlling electrical appliances, and more particularly to a method of remotely controlling electrical appliances.

2. Description of Related Art

Typically, a conventional electrical appliance has a control apparatus thereon for users to manually control its operation. If a user intents to turn on, turn off, or operate such electrical appliances, he/she has to be next to the to-be-controlled electrical appliance, and directly manipulate its control apparatus, which is quite inconvenient.

In order to improve the drawback mentioned above, some electrical appliances are further paired with a remote control, which is able to communicate the control apparatus through a radio frequency (RF) control module provided on the electrical appliances. A remote control transmits wireless RF signals which contain commands to the RF control module of the paired electrical appliance, and once the RF control module receives the wireless RF signals and consequently obtains the commands within, the control apparatus is then controlled accordingly to turn on, turn off, or operate the electrical appliance.

However, although electrical appliances can be wirelessly controlled with the aforementioned design, the number of remote controls corresponds to the number of electrical appliances. In other words, with more electrical appliances there would be more remote controls, and this kind of trend is rather common in home life. It has become burdensome to manage so many remote controls. In addition, with the development of wireless Internet technology, Wi-Fi wireless Internet gradually becomes ubiquitous in everyone's home. Therefore, if Wi-Fi signals can be used to control the conventional electrical appliances, the operational convenience would be greatly enhanced.

BRIEF SUMMARY OF THE INVENTION

In view of the above, the primary objective of the present invention is to provide a method of remotely controlling electrical appliances, which converts Wi-Fi signals into RF signals to control multiple electrical appliances.

The method of remotely controlling electrical appliances includes the following steps: A. provides a plurality of electrical appliances and a repeater, wherein each of the electrical appliances is stored with a unique ID code, and the repeater communicates with the electrical appliances through RF signals; B. inputs the ID codes of the electrical appliances into a remote control device, wherein the remote control device communicates with the repeater through Wi-Fi signals; C. selects one of the electrical appliances and one of operating commands which corresponds to the selected electrical appliance through the remote control device, and accordingly generates a Wi-Fi signal with the remote control device, wherein a first packet, which includes a first ID code field and a first data field, is carried by the Wi-Fi signal; the ID code of the selected electrical appliance is recorded in the first ID code field, and the selected operating command is recorded in the first data field; D. transmits the Wi-Fi signal to the repeater, converts the first packet carried thereby into a second packet with the repeater, and then generates a RF signal to carry the second packet with the repeater, wherein the second packet includes a second ID code field and a second data field; the ID code in the first ID code field and the operating command in the first data field are copied to the second ID code field and the second data field respectively; E. transmits the RF signal to each of the electrical appliances, compares the ID code in the second ID code field to the ID code stored in each of the electrical appliances, and then performs an operation according to the operating command in the second data field with the electrical appliance which has identical ID code to the ID code in the second ID code field.

Whereby, with the aforementioned design, it is effective to establish connections between the remote control device and the electrical appliances, and Wi-Fi signals can be converted into wireless RF signals to achieve the purpose of controlling multiple electrical appliances.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
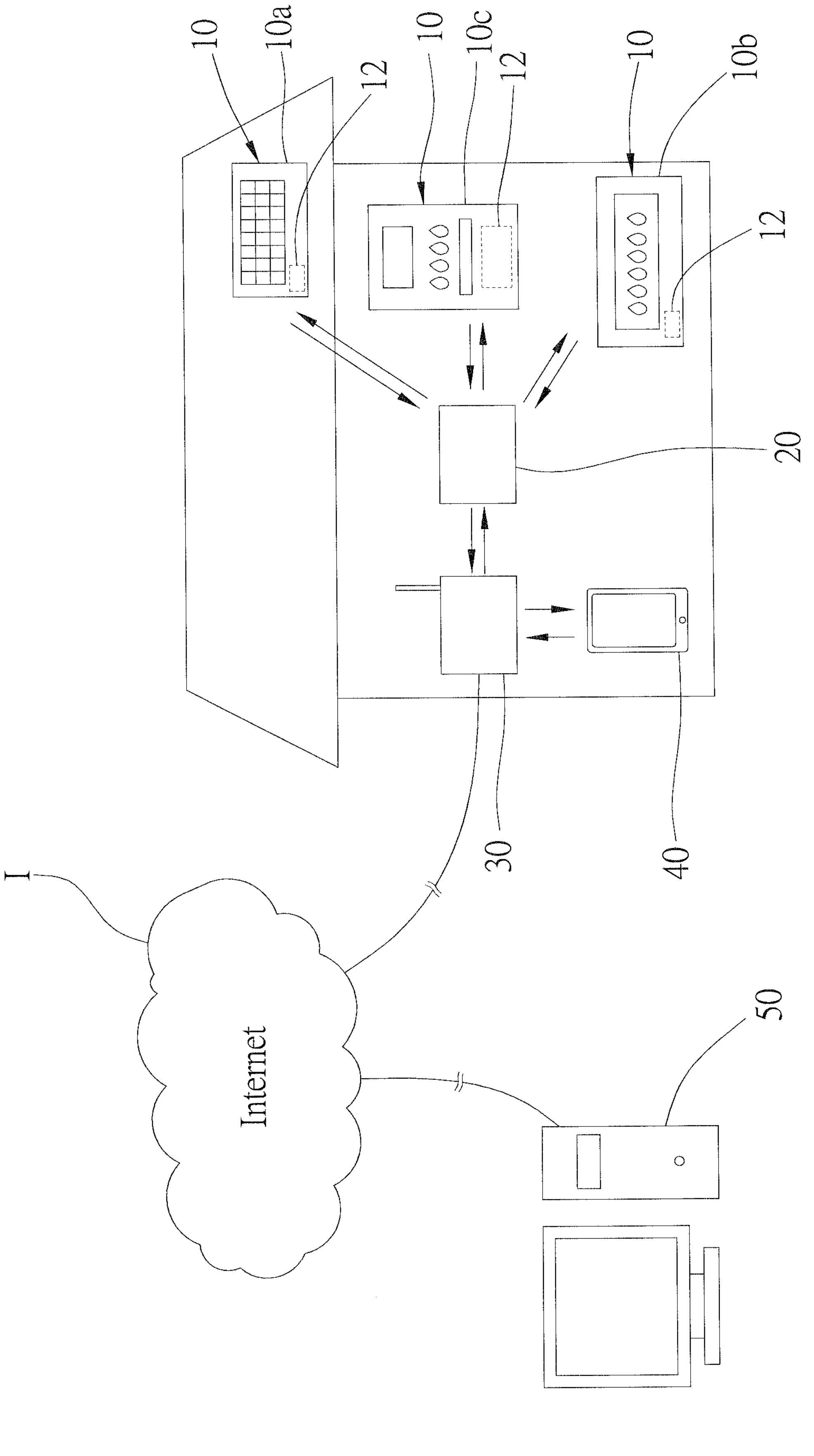
FIG. 1 is a schematic diagram of the wireless control system of a preferred embodiment of the present invention.

As shown in FIG. 1, a method of remotely controlling electrical appliances of the preferred embodiment of the present invention is applied to a wireless control system, which includes a plurality of electrical appliances 10, a repeater 20, and a remote control device. In the preferred embodiment, the remote control device includes an AP (access point) 30, a mobile device which is exemplified by a tablet PC 40, and a server 50.

Figure 2:
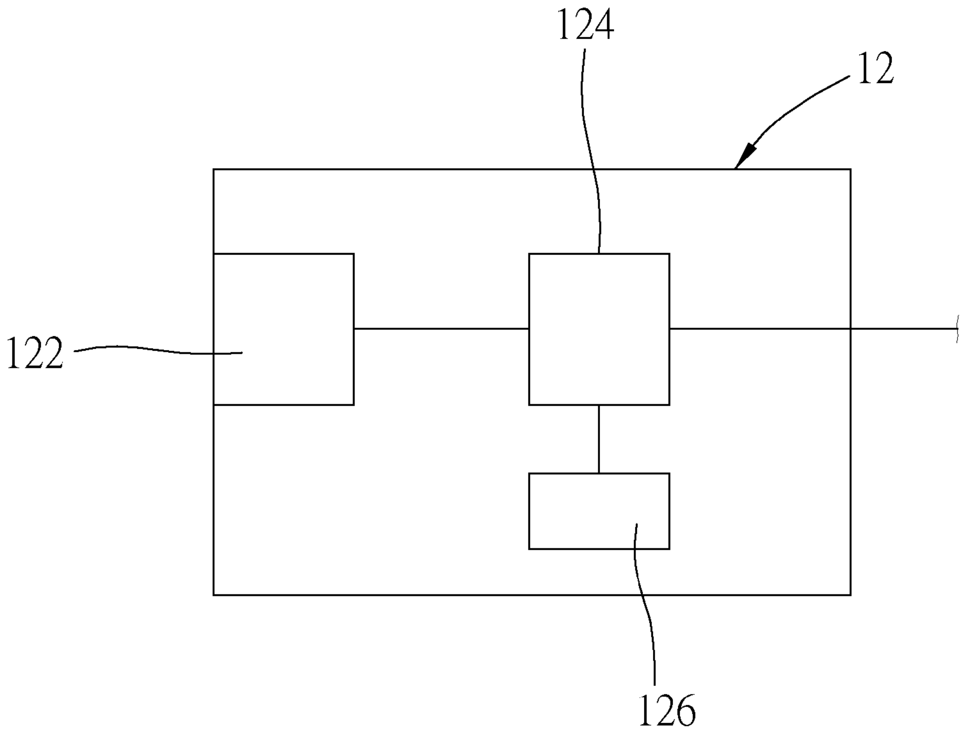
FIG. 2 is a block diagram of the circuit of the control unit of the preferred embodiment of the present invention.

In the preferred embodiment, the electrical appliances 10 include an air-conditioning system 10*a*, a fireplace 10*b*, and a water heater 10*c* installed in a user's home. Each of the electrical appliances 10 respectively has a control unit 12. As shown in FIG. 2, each of the control units 12 respectively has a RF transceiver circuit 122, a control circuit 124, and a memory 126, wherein the RF transceiver circuit 122 receives and transmits RF (radio frequency) signals. Take one of the electrical appliances 10 for explanation, the control circuit 124 controls the electrical appliance 10 to perform certain operations such as switching on, switching off, adjusting temperature, etc., according to operating commands contained in RF signals received by the RF transceiver circuit 122. Similarly, the control circuit 124 generates RF signals to carry an operating status of the electrical appliance 10, and the RF signals are transmitted through the RF transceiver circuit 122. Said operating status may indicate current conditions of the electrical appliance 10, such as whether the electrical appliance 10 is switched on or off, or even indicate its current temperature, rotating speed, and so on. The memory 126 keeps an ID code and a model code of the electrical appliance 10. In the preferred embodiment, the ID code is an address assigned to the electrical appliance 10 when it is being connected to the repeater 20, while the model code includes information pertaining to the electrical appliance 10, such as a product category, a serial number, etc. The control circuit 124 further generates an error code when the electrical appliance 10 performs an abnormal operation, and the error code is kept in the memory 126.

Figure 3:
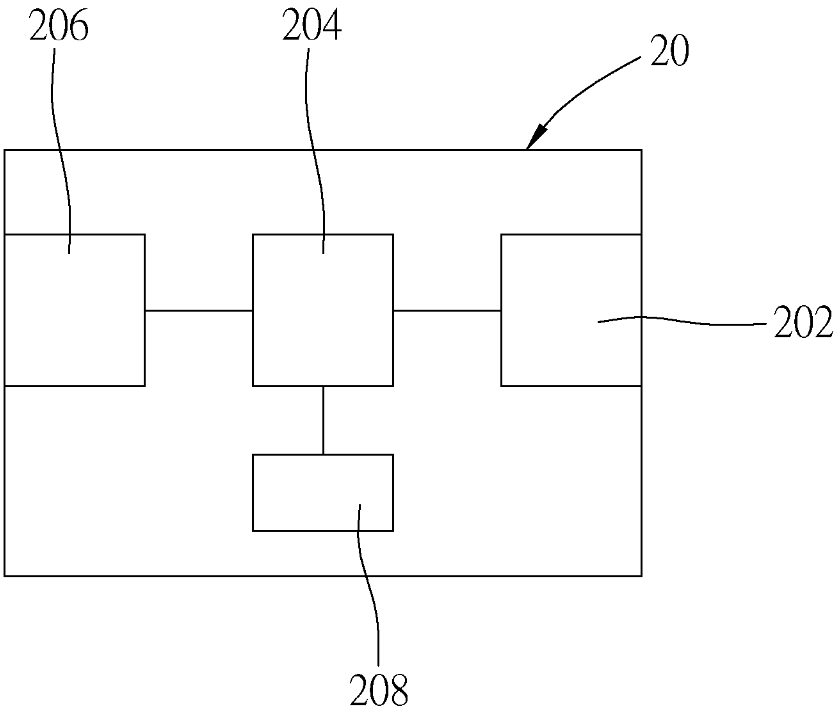
FIG. 3 is a block diagram of the circuit of the repeater of the preferred embodiment of the present invention.

As shown in FIG. 3, the repeater 20 includes a RF transceiver circuit 202, a converting circuit 204, a Wi-Fi transceiver circuit 206, and a memory 208, wherein the RF transceiver circuit 202, the converting circuit 204, and the Wi-Fi transceiver circuit 206 are electrically connected in serial, while the memory 208 is electrically connected to the converting circuit 204. The RF transceiver circuit 202 receives the RF signals from the RF transceiver circuits 122 of the electrical appliances 10. The converting circuit 204 converts the RF signals into Wi-Fi signals, which then are transmitted by the Wi-Fi transceiver circuit 206. And vice versa, the Wi-Fi transceiver circuit 206 also receives Wi-Fi signals, and the converting circuit 204 converts the received Wi-Fi signals into RF signals, which are then transmitted through the RF transceiver circuit 202.

The memory 208 keeps a device code specifically belonged to the repeater 20. In addition, the ID codes and the model codes of the electrical appliances 10 are kept in the memory 208 in advance. Data from the electrical appliances 10, such as error codes, are also kept in the memory 208.

The AP 30 communicates with the server 50 through Internet I, and the AP 30 communicates with the tablet PC 40 and the repeater 20 through Wi-Fi protocol. The tablet PC 40 is installed with an application for the user to control the electrical appliances 10, such as switching on, switching off, adjusting temperature, etc. Of course, in practice, the mobile device is not necessary to be the tablet PC 40, and it can be a smartphone, a desktop, a laptop, a PDA, or any other devices that is able to generate Wi-Fi signals.

After the tablet PC 40 and the repeater 20 are connected, the repeater 20 transmits the device code, the ID codes and model codes of the electrical appliances 10 kept in its memory 208 to the tablet PC 40, and these data are inputted into the tablet PC 40 in this way. The application of the tablet PC 40 establishes connections between the electrical appliances 10 and the repeater 20 according to the ID codes and the device code.

With the aforementioned wireless control system, the method of remotely controlling electrical appliances provided in the present invention can be applied.

Figure 4:
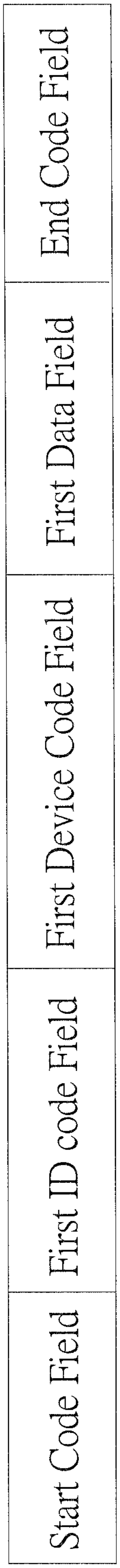
FIG. 4 is a schematic diagram of the first packet of the preferred embodiment of the present invention.

First, the user selects one of the electrical appliances 10 on the tablet PC 40 that he/she intends to control. After a specified electrical appliance 10 is selected, the application generates a plurality of control options according to the model code of the selected electrical appliance 10, and the user then selects one of the control options to generate an operating command accordingly. After that, the application of the tablet PC 40 generates a first packet, which is shown in FIG. 4, wherein the first packet includes a first device code field, a first ID code field and a first data field. The device code of the repeater is recorded in the first device code field, the ID code of the selected electrical appliance 10 is recorded in the first ID code field, and the selected operating command is recorded in the first data field. The tablet PC 40 generates a Wi-Fi signal to carry the first packet, and the Wi-Fi signal is then transmitted to the repeater 20 through the AP 30.

Figure 5:
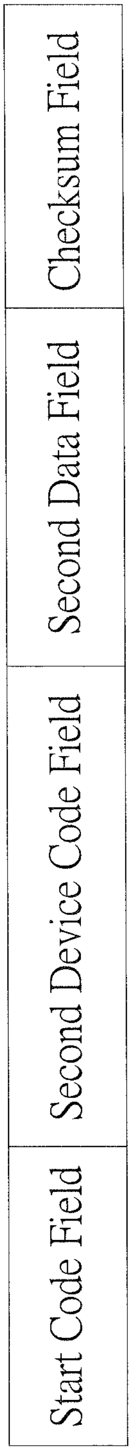
FIG. 5 is a schematic diagram of the second packet of the preferred embodiment of the present invention.

The Wi-Fi transceiver circuit 206 of the repeater 20 receives the Wi-Fi signal and extracts the first packet. The extracted first packet is then transmitted to the converting circuit 204. If the device code of the first device code field of the first packet is identical to the device code kept in the memory 208, the converting circuit 204 converts the first packet into a second packet, which is shown in FIG. 5, wherein the second packet includes a second ID code field and a second data field. The ID code in the first ID code field and the operating command in the first data field are respectively copied to the second ID code field and the second data field. The converting circuit 204 generates a RF signal to carry the second packet, which is transmitted through the RF transceiver circuit 202.

If the device code in the first device code field of the first packet does not correspond to the device code kept in the memory 208, the converting circuit 204 simply ignores the first packet. In this way, there can be more than one repeater in surroundings, and the converting circuit 204 of each repeater would not mistakenly convert packets which are intended to be transmitted to other repeaters.

After said RF signal is received by the RF transceiver circuit 122 of each of the electrical appliances 10, the second packet carried thereby is extracted and transmitted to the control circuit 124. The control circuit 124 determines if the ID code in the second ID code field corresponds to the ID code kept in the memory 126. The electrical appliance 10 which has the corresponding ID code performs an operation, such as switching on, switching off, or adjusting temperature, according to the operating command in the second data field.

For those electrical appliances 10 whose ID code does not correspond to the ID code in the second ID code field, the second packet is simply ignored. As a result, each one of the electrical appliances 10 would not mistakenly perform an operation due to a packet that is intended to be transmitted to any other electrical appliances 10.

Figure 6:
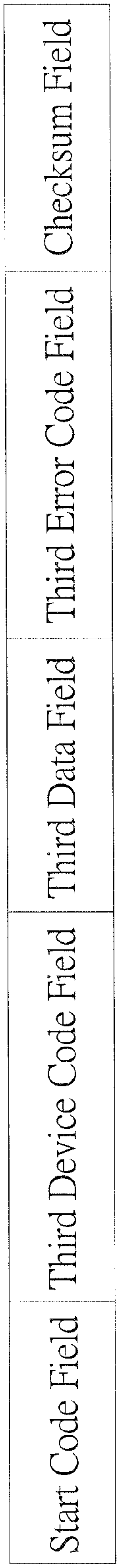
FIG. 6 is a schematic diagram of the third packet of the preferred embodiment of the present invention.

After that, each control circuit 124 generates a RF signal to carry a third packet, which is shown in FIG. 6, according to the operating status of the electrical appliance 10 which it belongs to, wherein the third packet includes a third ID code field, a third data field, and a third error code field. The ID code and the operating status of the electrical appliance 10 which has the control circuit 124 are sequentially and respectively recorded in the third ID code field and the third data field, wherein the operating status may indicate whether the referred electrical appliance 10 is switched on or off, or indicate the current temperature thereof, etc. As to the third error code field, the error code generated by the control circuit 124 is recorded therein.

Figure 7:
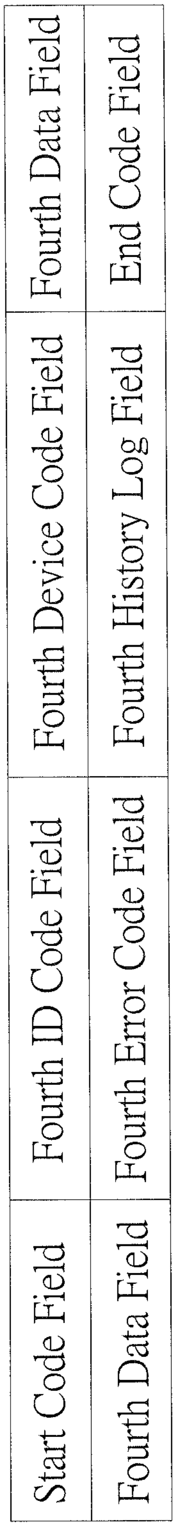
FIG. 7 is a schematic diagram of the fourth packet of the preferred embodiment of the present invention.

The RF transceiver circuit 202 of the repeater 20 receives the RF signal which carries the third packet. The third packet is extracted and then transmitted to the converting circuit 204. Once the converting circuit 204 obtains the error code in the third error code field of the third packet, the error code is saved into the memory 208 as a history log. In addition, the converting circuit 204 also converts the third packet into a fourth packet, which is shown in FIG. 7. The Wi-Fi transceiver circuit 206 generates a Wi-Fi signal to carry the fourth packet, and then said Wi-Fi signal is transmitted to the tablet PC 40. The fourth packet includes a fourth device code field, a fourth ID code field, a fourth data field, a fourth error code field, and a fourth history log field. The device code kept in the memory 208 is recorded in the fourth device code field, while ID code in the third ID code field, the operating status in the third data field, and the error code in the third error code field are sequentially and respectively copied to the fourth ID code field, the fourth data field, and the fourth error code field. The error code(s) which is generated by the electrical appliances 10 and kept in the memory 208 is recorded in the fourth history log field.

Whereby, the tablet PC 40 is able to be informed the operating statuses of the electrical appliances 10 through the fourth packets feedbacked from the electrical appliances 10, and the operating statuses can be displayed on a screen of the tablet PC 40 for the user's convenience. Meanwhile, the user can also realize that any one of the electrical appliances 10 is operating abnormally through the error codes, and the history logs which correspond to the error codes can be useful references for the user or maintenance personnel while maintaining or repairing the electrical appliances 10.

The communication between the tablet PC 40, the repeater 20, and the electrical appliances 10 is merely an example. Similarly, a server 50 also communicates with the repeater 20 and the electrical appliances 10 in approximate the same way, except that the user selects one of the electrical appliances 10 and the corresponding operating commands on the server 50 instead, and the server 50 generates a network signal to carry the first packet, wherein the network signal is transmitted to the AP 30 through the Internet I. The AP 30 then generates and transmits a Wi-Fi signal which carries the first packet to the electrical appliances 10. And vice versa, the repeater 20 also transmits the Wi-Fi signal which carries the fourth packet to the AP 30, which generates a network signal to carry the fourth packet, and the network signal is then transmitted to the server 50. In practice, the tablet PC 40 can be directly connected to the repeater 20 without the intermediation of the AP 30, and it can still transmits the first packet and receives the fourth packet in this way.

It must be pointed out that the embodiments described above are only some preferred embodiments of the present invention. All equivalent methods which employ the concepts disclosed in this specification and the appended claims should fall within the scope of the present invention.

What is claimed is:

1. A method of remotely controlling electrical appliances, comprising the steps of:

A. providing a plurality of electrical appliances and a repeater, wherein each of the electrical appliances is stored with a unique ID code, and the repeater communicates with the electrical appliances through RF signals, wherein ID stands for identification, and RF stands for radio frequency;

B. inputting an ID code of one of the electrical appliances into a remote control device, wherein the remote control device communicates with the repeater through Wi-Fi signals, wherein Wi-Fi is a brand name certifying wireless fidelity;

C. selecting one of the electrical appliances and one of operating commands which corresponds to the selected electrical appliance through the remote control device, and accordingly generating a Wi-Fi signal with the remote control device, wherein a first packet, which includes a first ID code field and a first data field, is carried by the Wi-Fi signal; the ID code of the selected electrical appliance is recorded in the first ID code field, and the selected operating command is recorded in the first data field;

D. transmitting the Wi-Fi signal to the repeater, converting the first packet carried thereby into a second packet with the repeater, and then generating a RF signal to carry the second packet with the repeater, wherein the second packet includes a second ID code field and a second data field; the ID code in the first ID code field and the operating command in the first data field are copied to the second ID code field and the second data field respectively;

E. transmitting the RF signal to each of the electrical appliances, comparing the ID code in the second ID code field to the ID code stored in each of the electrical appliances, and then performing an operation according to the operating command in the second data field with the electrical appliance which has identical ID code to the ID code in the second ID code field;

wherein the repeater has a device code, which is also inputted into the remote control device in step B; the remote control device establishes connections between the electrical appliances and the repeater according to the ID codes before performing step C; the first packet further includes a first device code field, and the device code of the repeater is recorded in the first device code field; if the device code in the first device code field of the first packet matches the device code of the repeater, the repeater converts the first packet into the second packet in step D.

2. The method of claim 1, wherein the ID codes of the electrical appliances are also kept by the repeater; the ID codes of the electrical appliances are transmitted to the remote control device through the repeater; the remote control device establishes connections between the electrical appliances and the repeater according to the ID codes and the device code before step C.

3. The method of claim 1, further comprising the steps of:

F. respectively generating a RF signal to carry a third packet with each of the electrical appliances to indicate an operating status thereof, wherein each of the third packet includes a third ID code field and a third data field; the ID code and the operating status of the electrical appliance which generates the third packet are sequentially and respectively recorded in the third ID code field and the third data field;

G. transmitting the RF signal which carries the third packet to the repeater, converting the third packet carried thereby into a fourth packet with the repeater, and then generating a Wi-Fi signal to carry the fourth packet with the repeater wherein the fourth packet includes a fourth device code field, a fourth ID code field, and a fourth data field; the device code of the repeater is recorded in the fourth device code field; the ID code in the third ID code field and the operating status in the third data field are copied to the fourth ID code field and the fourth data field respectively;

H. transmitting the Wi-Fi signal which carries the fourth packet to the remote control device.

4. The method of claim 3, wherein each of the electrical appliances generates an error code when an abnormal operation occurs; each of the third packet further includes a third error code field, and the error code generated by the corresponding electrical appliance is recorded in the third error code field; the fourth packet further includes a fourth error code field, and the error code in the third error code field is copied to the fourth error code field.

5. The method of claim 4, wherein the error code in the third error code field of the third packet is also kept in the repeater as a history log; the fourth packet further includes a fourth history log field, and the history log kept in the repeater is recorded in the fourth history log field.

6. The method of claim 1, wherein each of the electrical appliances further has a model code, which is also inputted into the remote control device in step B; a plurality of control options are listed according to the model code of the selected electrical appliance in step C, and the operating command is generated by selecting one of the control options.

7. The method of claim 1, wherein the remote control device includes a mobile device, which communicates with the repeater through Wi-Fi signals; one of the electrical appliances and the corresponding operating command is selected on the mobile device in step C, and the Wi-Fi signal which carries the first packet is generated accordingly.

8. The method of claim 1, wherein the remote control device includes a mobile device and an access point; the mobile device communicates with the access point through Wi-Fi signals, and the access point communicates with the repeater through Wi-Fi signals; one of the electrical appliances and the corresponding operating command is selected on the mobile device in step C, and the Wi-Fi signal which carries the first packet is generated accordingly and transmitted to the repeater through the access point.

9. The method of claim 1, wherein the remote control device includes a server and an access point; the server communicates with the access point through an Internet, and the repeater communicates with the access point through Wi-Fi signals; one of the electrical appliances and the corresponding operating command is selected on the server in step C, and an Internet signal is generated accordingly to carry the first packet; the Internet signal is transmitted to the access point to generate the Wi-Fi signal which carries the first packet.

* * * * *